US006513875B1

(12) United States Patent
Gray et al.

(10) Patent No.: US 6,513,875 B1
(45) Date of Patent: Feb. 4, 2003

(54) FOLD-FLAT RECLINING MECHANISM FOR A VEHICLE SEAT

(75) Inventors: Larry Gray, Westfield, IN (US); James Eaton, Carmel, IN (US)

(73) Assignee: Porter Engineered Systems, Westfield, IN (US)

(*) Notice: Subject to any disclaimer, the term of this patent is extended or adjusted under 35 U.S.C. 154(b) by 0 days.

(21) Appl. No.: 09/706,039

(22) Filed: Nov. 3, 2000

(51) Int. Cl.$^7$ .................................................. B60N 2/20
(52) U.S. Cl. ............................ 297/378.14; 297/378.12; 297/354.12
(58) Field of Search ...................... 297/378.12, 378.14, 297/354.12

(56) References Cited

U.S. PATENT DOCUMENTS

| | | | |
|---|---|---|---|
| 2,620,020 A | * 12/1952 | Austin | 297/340 |
| 3,580,635 A | 5/1971 | Posh | |
| 3,727,978 A | 4/1973 | Barriere et al. | |
| 3,887,232 A | 6/1975 | Dinkel | |
| 4,103,964 A | 8/1978 | Klingelhofer et al. | |
| 4,169,626 A | 10/1979 | Hollar, Jr. | |
| 4,218,091 A | 8/1980 | Webster | |
| 4,269,446 A | 5/1981 | Gersmann et al. | |
| 4,368,916 A | * 1/1983 | Blasin | 297/341 |
| 4,634,182 A | 1/1987 | Tanaka | |
| 4,685,736 A | 8/1987 | Tanaka et al. | |
| 4,799,733 A | * 1/1989 | Beley et al. | 297/378.12 |
| 4,978,170 A | * 12/1990 | Pelz et al. | 297/411.39 |
| 5,217,195 A | 6/1993 | Tanaka et al. | |
| 5,219,045 A | 6/1993 | Porter et al. | |
| 5,441,129 A | 8/1995 | Porter et al. | |
| 5,482,349 A | 1/1996 | Richter et al. | |
| 5,547,255 A | 8/1996 | Ito et al. | |
| 5,547,256 A | * 8/1996 | D'Antuono et al. | 297/377 |
| 5,568,843 A | 10/1996 | Porter et al. | |
| 5,706,705 A | 1/1998 | Stringer | |
| 5,755,493 A | 5/1998 | Kodaverdian | |
| 5,794,470 A | 8/1998 | Stringer | |
| 5,806,932 A | 9/1998 | Zhuang | |
| 5,819,881 A | 10/1998 | Stringer | |
| 5,887,949 A | 3/1999 | Kodaverdian | |
| 6,139,104 A | 10/2000 | Brewer | |
| 6,152,533 A | * 11/2000 | Smuk | 297/341 |
| 6,161,899 A | * 12/2000 | Yu | 297/378.12 |
| 6,290,297 B1 | * 9/2001 | Yu | 297/378.12 |

FOREIGN PATENT DOCUMENTS

| | | |
|---|---|---|
| DE | 19741996 | 3/1999 |
| EP | 0867329 | 9/1998 |
| EP | 0980785 | 2/2000 |
| WO | WO 98/45136 | 10/1998 |

OTHER PUBLICATIONS

Copy of International Search Report for International Application No. US01/44895 mailed on Jun. 27, 2002.

\* cited by examiner

*Primary Examiner*—Peter M. Cuomo
*Assistant Examiner*—Joseph Edell
(74) *Attorney, Agent, or Firm*—Baker & Daniels

(57) ABSTRACT

A fold-flat seat recliner mechanism for connecting the seat cushion to the seat back in a motor vehicle includes a lower plate assembly attachable to the seat cushion frame and an upper plate interconnecting the seat back and the lower plate assembly. The upper plate and lower plate assembly are interconnected by a parallelogram linkage that provides a range of reclining positions for the seat back relative to the seat cushion and allows the seat back to be folded flat relative to the seat cushion from any recline angle. During folding, the linkage retains its previous geometry so that the seat back, when unfolded, returns to its previously set recline angle. The mechanism is used in pairs, one on each side of the seat. On one side the recliner mechanism includes a mechanism for adjusting the seat back recline angle and a latch operable to inhibit or allow folding of the seat back.

31 Claims, 8 Drawing Sheets

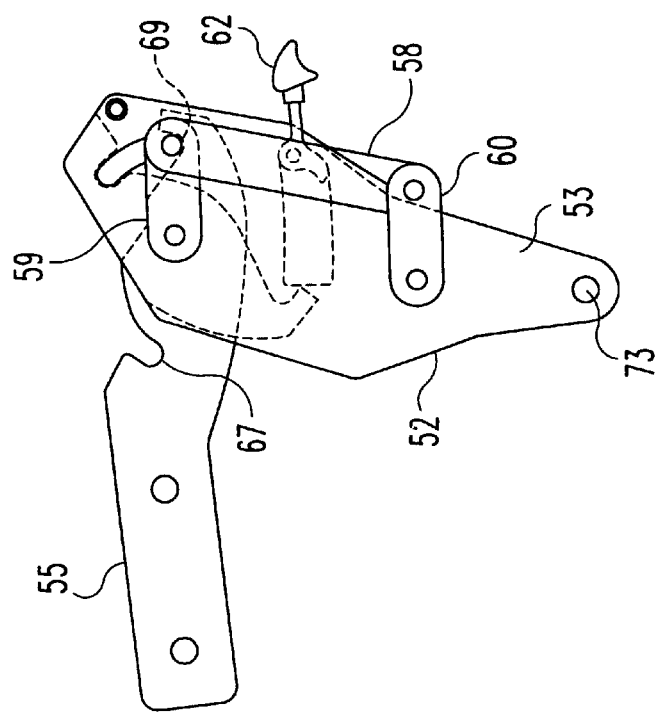
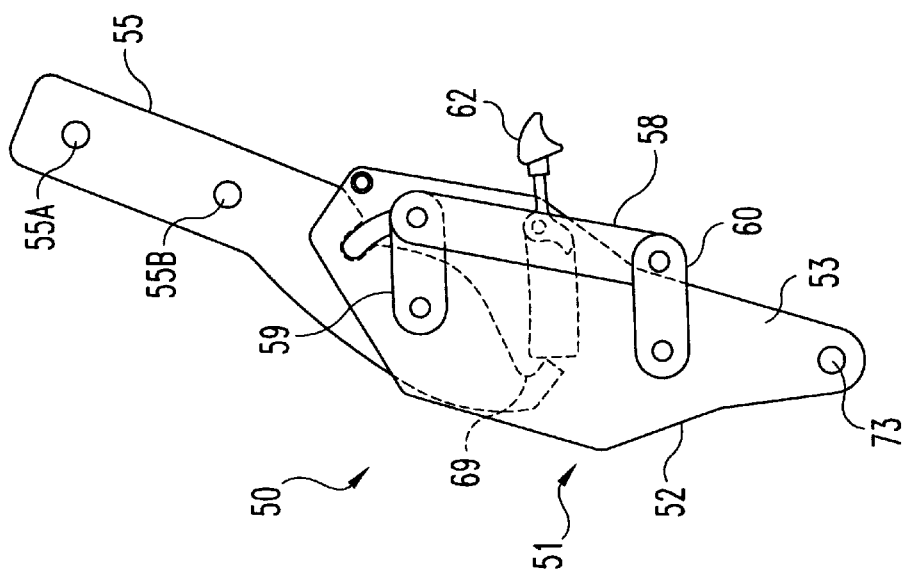
Fig. 5B
Fig. 5A

FOLD-FLAT RECLINING MECHANISM FOR A VEHICLE SEAT

BACKGROUND OF THE INVENTION

The present invention relates to reclining and fold-flat mechanisms for the passenger seats in a vehicle. More specifically the invention relates to a mechanism that allows a seat to be folded flat from any recline angle and to maintain or remember the previously set recline angle when the seat is returned to its upright position.

Many seat reclining mechanisms are known and used in the automotive industry. In some applications, a fold-flat feature is provided that allows the seat back to be folded to a position substantially parallel to the seat bottom. This is particularly useful for carrying cargo and is commonly found in vans and sport utility vehicles. Some amount of fold over is also required in two door vehicles for access to the rear seat or rear compartment area. In addition, it is desirable to provide some degree of recline adjustment, at least for front seat occupants; however, some vans and SUV's also include this feature in the rear seats.

Current fold-flat systems are of two general types. One, the dedicated fold-flat mechanism, provides no recline function. The other is the rotary recliner with extended forward travel to a fold-flat position. The dedicated fold-flat mechanism is typically used in second or third row seating where the lack of a recline feature is less detrimental. Typical rotary recliner systems reposition the seat back to its forwardmost recline position during the fold-flat process thus requiring the recline angle of the seat back to be readjusted after the seat back is returned to an upright position. This shortcoming is particularly evident in those systems that combine the recline and fold-flat operations in a single actuation means. In addition, these systems also tend to require substantial manipulation to fold the seat back or restore the seat back to an upright position. As a result, systems have been developed that separate the seat recline feature from the fold-flat feature. These devices separate folding from the normal adjustments of the seat back so that the seat back does not lose its predetermined angle of inclination. Optimally, the pivot point for folding the seat back flat is higher than the pivot point for reclining the seat back.

One example is shown by patent U.S. Pat. No. 5,806,932, which is owned by the assignee of the present invention. The '932 patent relies upon a memory latch to establish the angle of inclination of the seat back. The memory latch is allowed to pivot when the seat is operated in its dump mode. In this dump position, the seat back is in its forward-most position for ingress/egress to the back seat or rear compartment. When the dumping has been completed, the latch is restored to its locked position to thereby re-establish the seat back at its user set angle. While the system of the '932 patent provides significant benefits over the prior adjustment mechanisms, there remains a need for improvements to seat adjustment and fold-flat mechanisms. For instance, most prior adjustment and fold-flat mechanisms rely upon relatively bulky stamped metal components that can be expensive and difficult to assemble.

There is therefore a need for a reclining mechanism with a memory feature that allows the seat back to fold flat when folded, while preserving the recline angle of the seat back. In addition, there is a need for such a system that is easy to operate, lightweight, compact, and that can be manufactured at a reasonable cost.

SUMMARY OF THE INVENTION

In order to address the needs left unfulfilled by prior devices, the present invention contemplates a fold-flat recliner mechanism for use in a vehicle seat that allows the seat back to be folded to a flat position relative to the lower seat cushion.

In one embodiment, the mechanism includes an upper plate attached to the seat back frame and a lower member pivotably attached to the seat cushion frame. The upper plate is pivotably connected to the lower member. A pair of links also pivotably interconnect the lower member and the seat cushion frame forming a parallelogram linkage that maintains a fixed and substantially parallel relationship between the seat back and lower seat cushion when the seat back is in a fold-flat position. The upper plate includes a stop pin that engages a stop area on one of the parallelogram links to stop the seat back in the substantially parallel position when the seat back is folded.

The mechanism also includes latch means to control folding of the seat back. Here, the lower member can include a slot within which the pin on the upper plate travels. A pawl retains the pin against one end of the slot when the seat back is in an upright position. A release lever is biased against the pawl to prevent folding of the seat back.

In another embodiment of the invention, the lower member is an assembly including left and right plates connectable to each other and pivotably connected to the seat cushion frame. An upper plate attached to the seat back is pivotably connected between the two lower plates. Links on either side of the assembly complete the formation of a parallelogram that maintains a fixed and substantially parallel relationship between the seat back and seat cushions when the seat back is folded.

In this embodiment, a link pin passes through an arcuate slot in the lower plates connecting link members on the right and left sides of the lower assembly. The slot limits the reclining range of the seat back. The link pin also operates as a stop when the seat back is folded by engaging a stop notch at the end of the upper plate. A fastener connecting the left and right plates also acts as a stop when the seat back is raised to an upright position. Folding of the seat back is controlled by a release lever mounted between the lower pates. The release lever is biased by a spring in a position engaging the lower end of the upper plate to inhibit folding of the seat back. Raising the release lever allows the seat back to be folded.

In both embodiments, the mechanism "remembers" the last set recline angle and returns to that recline angle when the seat back is raised from the fold-flat position. Also, in both embodiments, a separate assembly for adjusting the recline angle attaches to the lower end of the lower member.

It is an object of the invention to provide an easy to use reclining mechanism that allows the seat back to fold flat relative to the seat cushion, while preserving the recline angle of the seat back. The ability to fold the seat back to a flat or substantially parallel relationship should be maintained throughout the range of reclining positions for the seat back.

This and other objects, advantages and features are accomplished according to the devices, assemblies and methods of the present invention.

DESCRIPTION OF THE FIGURES

FIG. 5A is a side elevational view of a fold-flat reclining mechanism according to another embodiment of the present invention.

FIG. 5B is a side elevational view of a fold-flat reclining mechanism of FIG. 5A showing the upper plate in a folded position.

DESCRIPTION OF THE PREFERRED EMBODIMENTS

Figure 1:
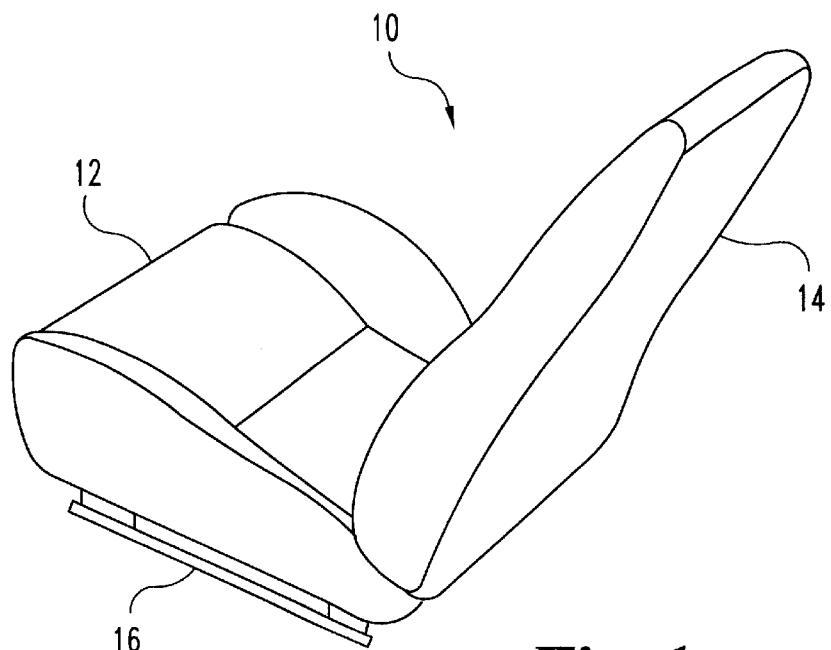
FIG. 1 is a perspective view of a typical seat for a motor vehicle.

For the purposes of promoting an understanding of the principles of the invention, reference will now be made to the embodiments illustrated in the drawings and specific language will be used to describe the same. It will nevertheless be understood that no limitation of the scope of the invention is thereby intended. The inventions includes any alterations and further modifications in the illustrated devices and described methods and further applications of the principles of the invention which would normally occur to one skilled in the art to which the invention relates.

In a vehicle application, the fold-flat recliner mechanism of the present invention would preferably be used in pairs, one on each side of the seat. The mechanisms would be identical with the exception that one side would include the added feature of a release lever to control folding of the seat back. This description is directed to the version including this release lever component.

Figure 2:
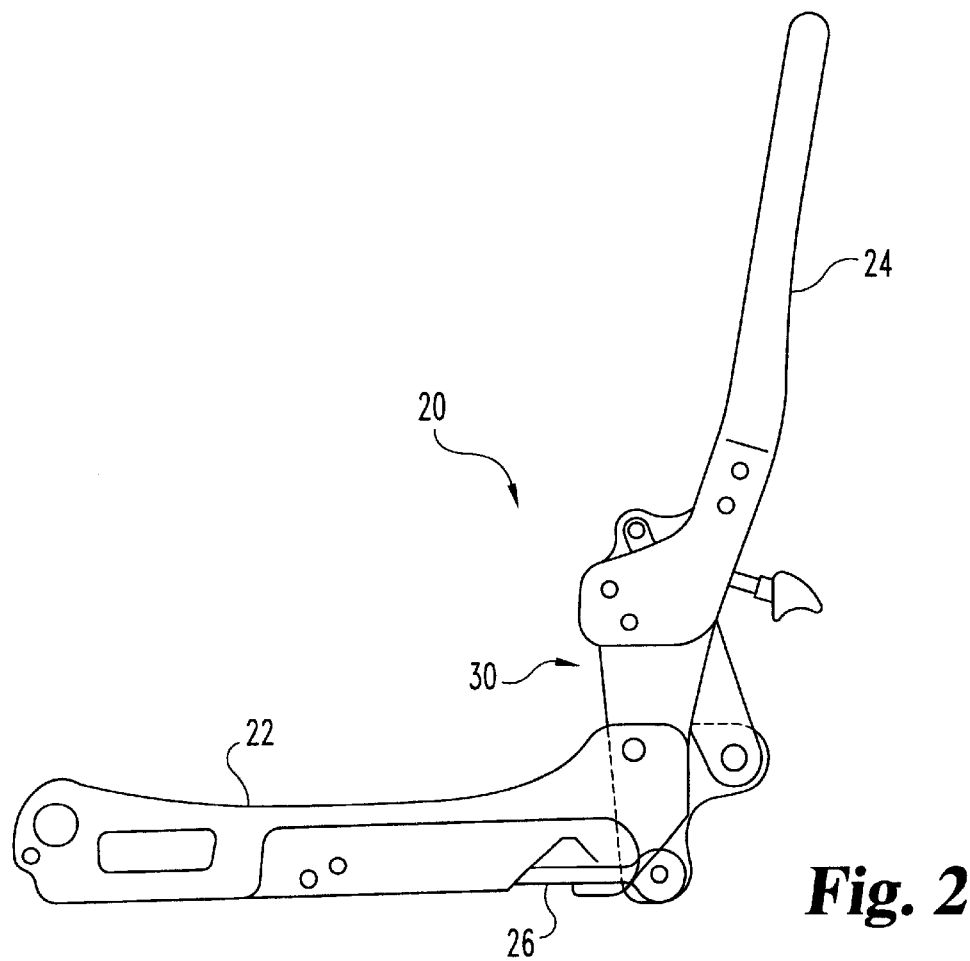
FIG. 2 is a side elevational view of a seat frame with a fold-flat reclining mechanism according to one embodiment of the present invention.

A seat for a vehicle is depicted in FIG. 1. The seat 10 includes a bottom cushion 12 and a cushioned seat back 14. The seat 10 is attached to the vehicle floor through the seat track 16. Turning to FIG. 2, the seat framework 20 is shown. The bottom cushion 12 is supported by a bottom frame 22 that attaches to the seat track 16. The seat back frame 24 is connected to the bottom frame 22 by a fold-flat recliner mechanism 30. Rod 26 is a recline adjuster actuating rod for adjusting the recline angle of the seat back. The rod 26 is connected between the recliner mechanism 30 and the bottom frame 22.

Figure 3A:
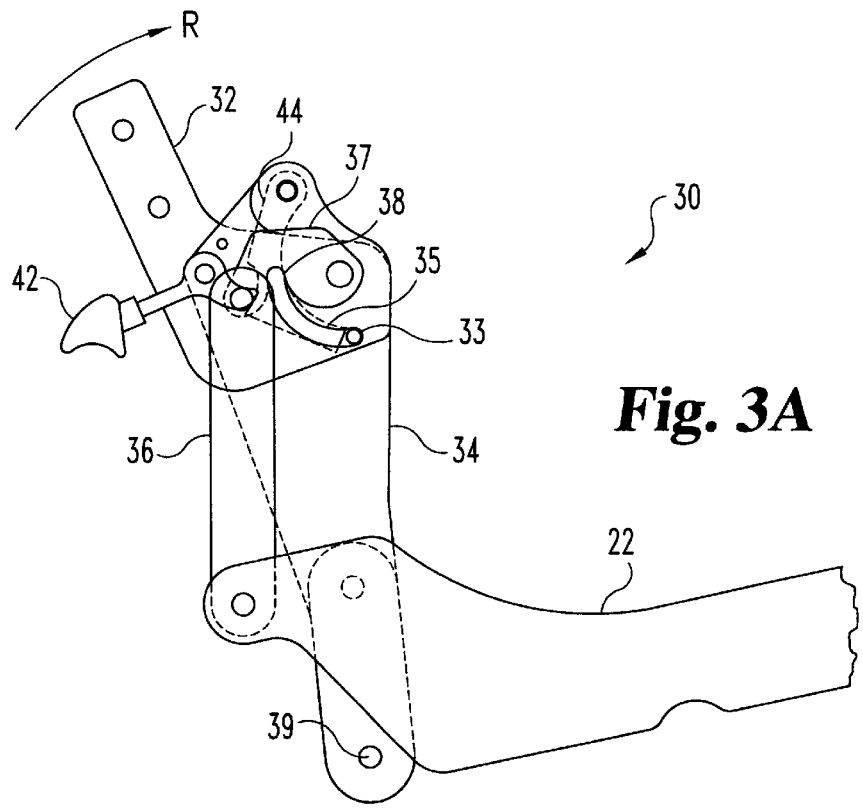
FIG. 3A is a detail side elevational view of the fold-flat reclining mechanism depicted in FIG. 2.
Figure 3B:
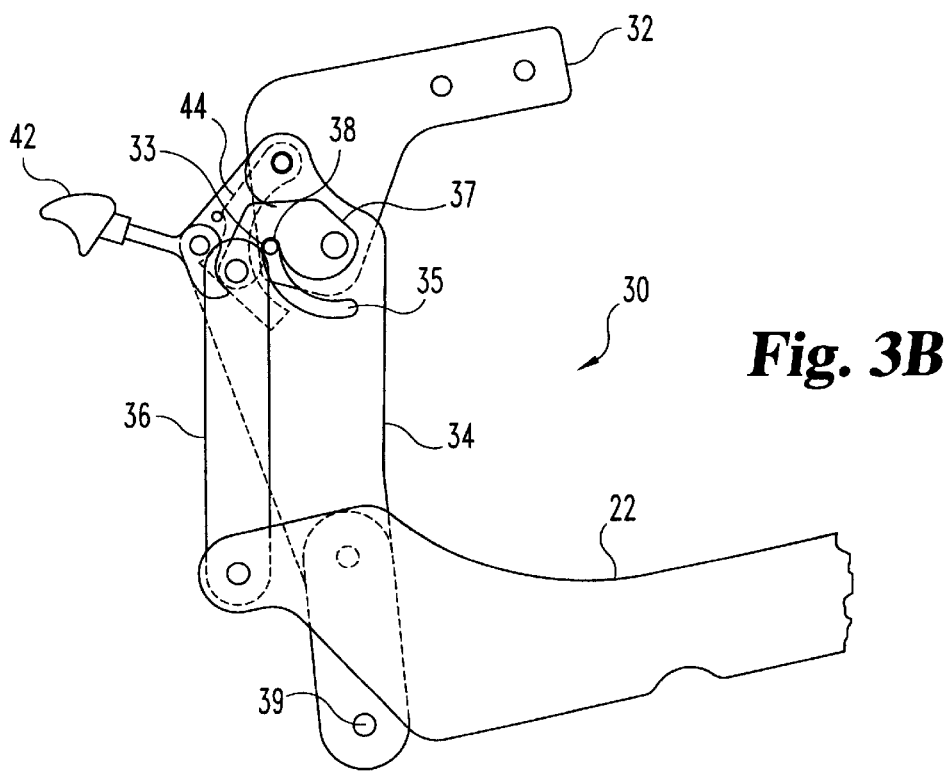
FIG. 3B is a side elevational view of the fold-flat reclining mechanism of FIG. 3A showing the upper plate in a folded position.
Figure 3C:
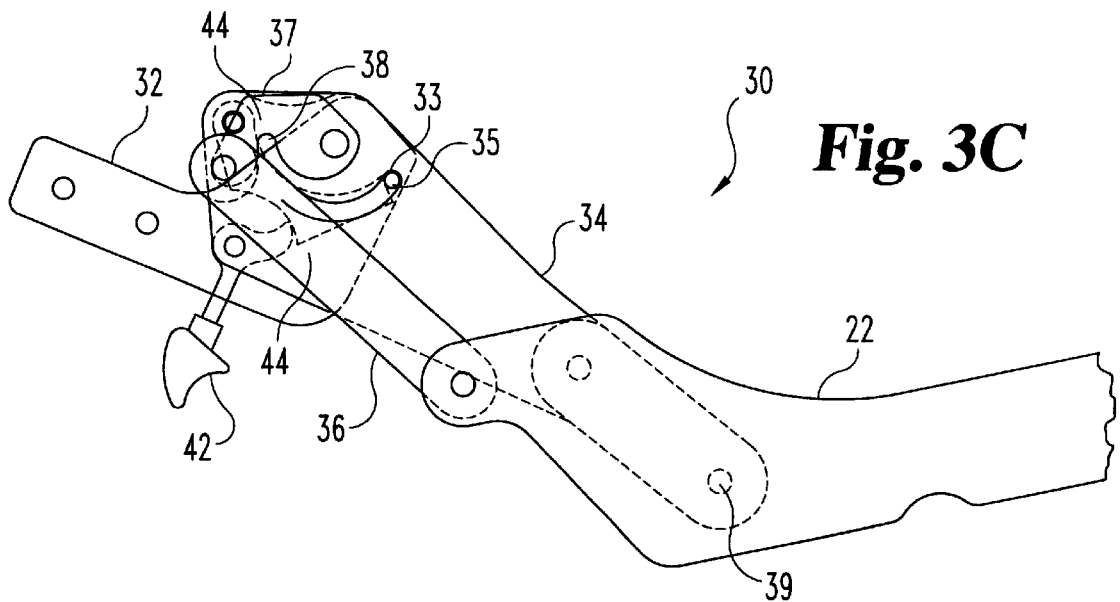
FIG. 3C is a side elevational view of the fold-flat reclining mechanism of FIG. 3A at a greater recline angle.
Figure 3D:
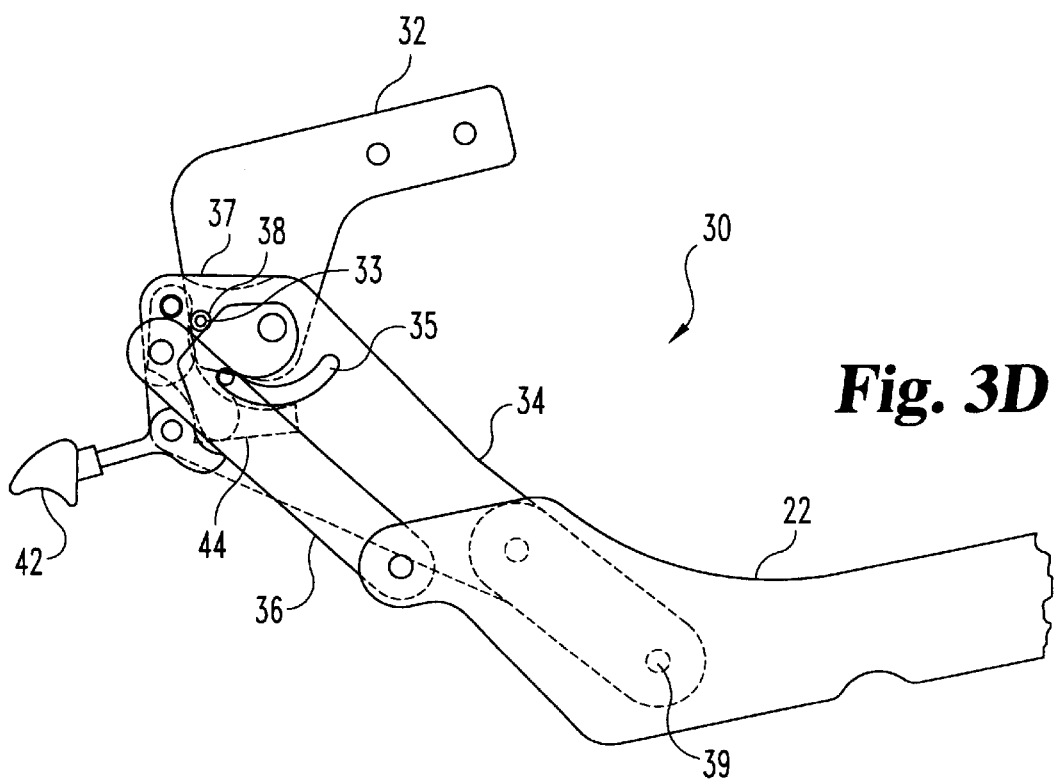
FIG. 3D is a side elevational view of the fold-flat reclining mechanism of FIG. 3C showing the upper plate in a folded position.
Figure 4:
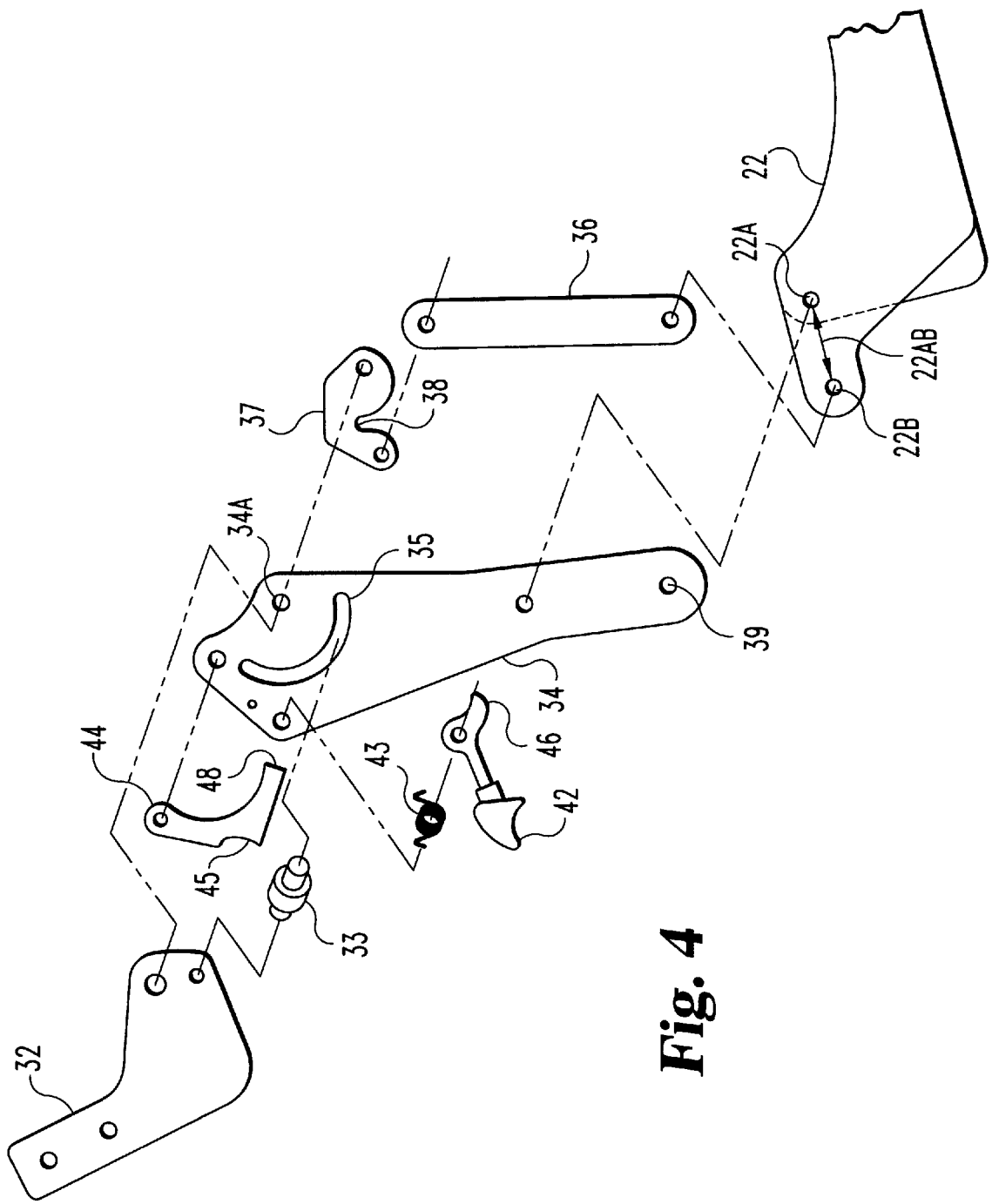
FIG. 4 is an exploded view of the fold-flat reclining mechanism shown in FIG. 3A.
Figure 6:
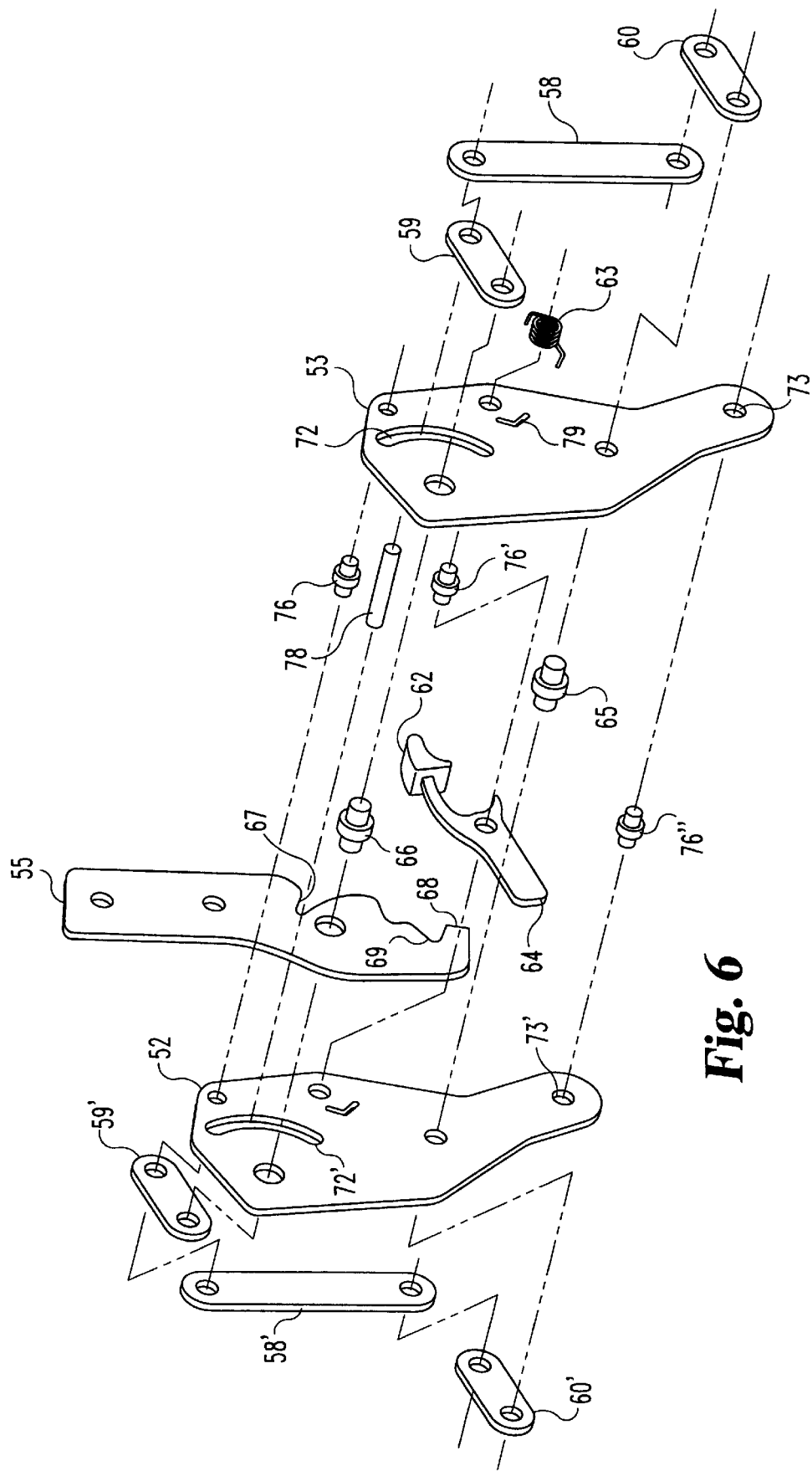
FIG. 6 is an exploded view of the fold-flat reclining mechanism shown in FIG. 5A.

The fold-flat recliner mechanism 30 (FIG. 2) is shown in more detail in FIGS. 3–4. According to a preferred embodiment of the invention, the mechanism 30 includes an upper plate 32 to which the seat back frame 24 is mounted. A lower member 34 is pivotably attached to the bottom frame 22 at attachment point 22A (FIG. 4). A first link 36 is pivotably attached to the bottom frame 22 at attachment point 22B. These attachments can be made using pivot bolts, rivets or any equivalent fastener. Similarly, a second link 37 pivotably connects the first link 36 to the lower member 34 at point 34A. These attachments likewise can be made using rivets, pivot bolts or the like. The bottom frame between attachment points 22A and 22B, along with the lower member 34 and links 36 and 37, define a four-bar parallelogram linkage, with bottom frame attachments 22A and 22B defining a fixed pseudo-link 22AB. This parallelogram is pivotable about the fixed link 22AB. Furthermore, the element formed by the second link 37 remains parallel to the fixed link 22AB on the bottom frame 22, and consequently substantially parallel with the bottom cushion 12. This is the basis of the fold-flat mechanism of the present invention.

The lower member 34 also includes a curved slot 35 centered on the point of attachment 34A of the upper plate 32 to the lower member 34. A stop pin 33 is attached to the upper plate 32 and extends into the slot 35 on the lower member 34. In FIG. 3A, the mechanism is representative of the seat back being in an upright seating position. In this position, stop pin 33 engages the end of slot 35 as show in FIG. 3A. A pawl 44 is pivotably attached to the lower member 34, sandwiched between the upper plate 32 and the lower member 34. The pawl 44 has a reaction end 48 configured to hold the stop pin 33 against the end of slot 35, thereby holding the seat back in an upright position.

A release lever 42 is also pivotably attached to the lower member 34. The release lever 42 has an engagement end 46 configured to react against an engagement surface 45 portion of pawl 44 so that the release lever 42 holds pawl 44 against stop pin 33 thus holding the upper plate 32 and therefore the seat back in an upright position. When the release lever 42 is raised, pawl 44 is free to move away from stop pin 33 which allows the upper plate 32 and the seat back to rotate to a fold-flat position. Spring 43 operates between the release lever 42 and the lower member 34 to bias the release lever against the pawl 44 thereby holding the upper plate in its upright position.

The second link 37 includes a stop surface 38 that limits the rotation of the upper plate 32 relative to the lower member 34. In a preferred embodiment, the stop surface 38 is in the form of a notch as shown most clearly in FIG. 4. The orientation of the seat back relative to the bottom frame in the folded position can be determined by the configuration of link 37 and stop surface 38. In a preferred embodiment of the invention, stop surface 38 is configured so that when the upper plate 32 is in the fold-flat position, the seat back will be parallel to the lower seat cushion or folded flat.

The parallelogram linkage determines the recline angle of the seat back. The lower extension of the lower member 34 includes an attachment point 39 for a recline adjuster. The recline adjuster can take any of several forms. One such adjuster is described in U.S. Pat. No. 5,441,129, which is owned by the assignee of the present invention and is hereby included by reference. However, the present invention could be adapted to work with any adjuster that operates by a rod or other member connected to the recliner mechanism. Operating the adjuster pivots the lower member 34 about the point 22A, which then changes the orientation of the parallelogram linkage. Upper plate 32 rotates with the upper end of lower member 34 about attachment point 22B as the adjuster moves the lower extension 39. Upper plate 32 moves or rotates forward or rearward opposite to the direction of movement of lower extension 39. This forward and rearward rotation of upper plate 32 determines the recline angle of the seat back. This is shown in FIGS. 3C and 3D where the mechanism is depicted at a greater recline angle relative to that of FIGS. 3A and 3B.

When the release lever 42 is raised, the pawl 44 is released so that it no longer inhibits movement of stop pin 33 so that the upper plate 32 can be rotated in the direction of arrow R to a fold-flat position as depicted in FIGS. 3B and 3D. In the fold-flat position, the stop pin 33 engages stop surface 38 on second link 37 to stop the upper plate 32 in a position parallel or flat relative to the bottom frame. The second link 37 retains its relationship relative to connecting points 22A and 22B on the bottom frame 22 throughout the reclining range due to their relative positions in the parallelogram linkage. This feature maintains the parallel relationship between the seat back and the bottom cushion in the preferred embodiment when the seat is in a fold-flat position.

Another embodiment of the invention is shown in FIGS. 5–8. In the mechanism 50, of FIG. 5A, with detail shown in FIG. 6, the lower member is a two-part assembly 51 made up of a left plate 52 and a right plate 53 that can be connected together using fasteners 76, 76' and 76". Rivets, pivot bolts or any other equivalent fasteners could be used to connect plates 52 and 53. In this embodiment, the upper plate 55 is pivotably attached to the lower assembly 51 and positioned between the left plate 52 and right plate 53. This embodiment also includes the parallelogram linkage and can have multiple links outside the lower assembly 51 providing one linkage on each side interconnected to each other. The interconnection can be accomplished by sizing link pin 78 and pivot sleeves 65 and 66 so that they extend through the lower plates 52 and 53 interconnecting links 60 and 60', 58 and 58', and 59 and 59' through their respective bores. This is depicted in detail in FIG. 6.

The upper plate 55, to which seat back frame 124 (FIG. 7A) is mounted at points 55A and 55B, is pivotably connected between lower plates 52 and 53 using a pivot sleeve 66 or equivalent fastener. Lower plates 52 and 53 are pivotably attached to the bottom frame 122 (FIG. 7A) using a second pivot sleeve 65 or equivalent fastener. Second parallelogram links 59 and 59' are pivotably connected at one end externally to the lower plates 52 and 53 at the upper plate connection using the upper plate pivot sleeve 66. First parallelogram links 58 and 58' are pivotably connected at one end to the other end of second links 59 and 59' respectively and at their other end to the bottom frame (see FIGS. 7A–8B) thus completing the parallelogram. Here again, the second links 59 and 59' remain in a parallel relationship to the bottom frame attachment points 122A and 122B (FIGS. 7A–8B) as the mechanism moves. This is demonstrated in FIGS. 7A and 8A which show the mechanism of FIG. 5A interconnecting partial bottom and seat back frames. As an optional feature, additional reinforcing links 60 and 60' (FIG. 6) can be added. These links interconnect the main pivot of the lower plates 52 and 53 with first links 58 and 58' at their connections to the bottom frame.

Lower plates 52 and 53 also define arcuate slots 72 and 72' centered on the upper pivot sleeve bore whereat upper plate 55 is attached. Link pin 78 extends trough slots 72 and 72' to interconnect links 58 and 59 with links 58' and 59'. The length of slots 72 and 72' determine the range of rotation of the parallelogram linkage. Upper plate 55 also defines a relief slot 67 configured to receive the link pin to allow greater seat back recline angles to be used. The link pin 78 also operates as a fold-over stop when the seat back is folded. Upper plate 55 defines a notch 69 configured to engage the link pin 78 to stop the seat back when in the fold-flat position. In the preferred embodiment, the notch 69 is positioned so that the seat back will be parallel to the seat cushion when in the fold-flat position. This is depicted in FIG. 5B. The fastener 76 at the upper connection of plates 52 and 53 also acts as a stop to limit the travel of the seat back when the seat back is raised back to a seating position.

Figure 7B:
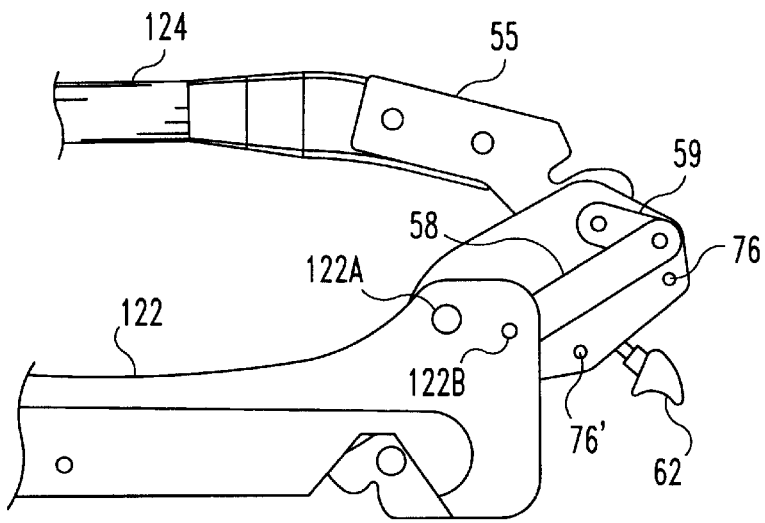
FIG. 7B is a side elevational view of the mechanism and structure of FIG. 7A with the seat back in a folded position.
Figure 7A:
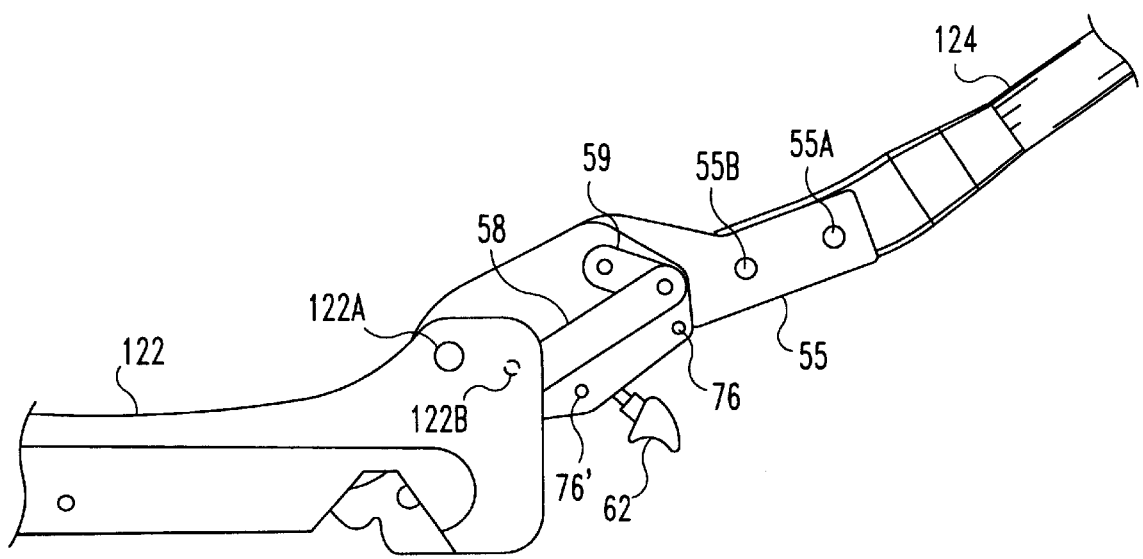
FIG. 7A is a side elevational view of the mechanism of FIG. 5A in a seat structure with the seat back reclined.
Figure 8B:
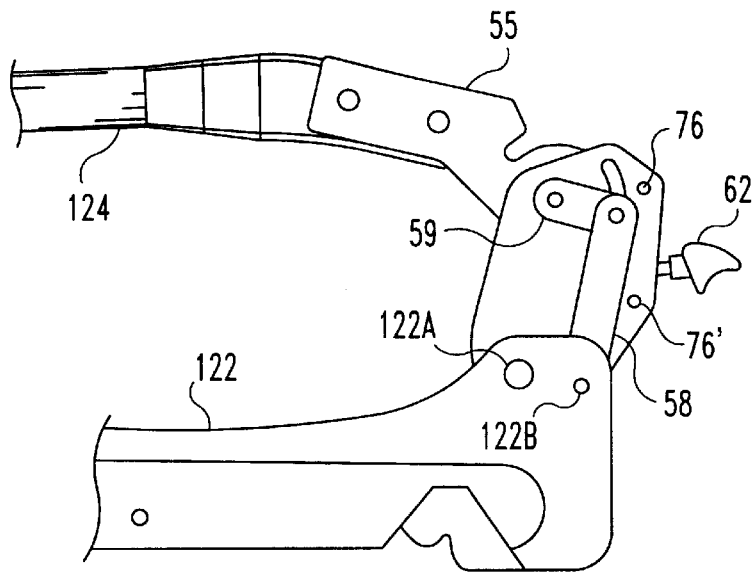
FIG. 8B is a side elevational view of the mechanism and structure of FIG. 8A with the seat back in a folded position.
Figure 8A:
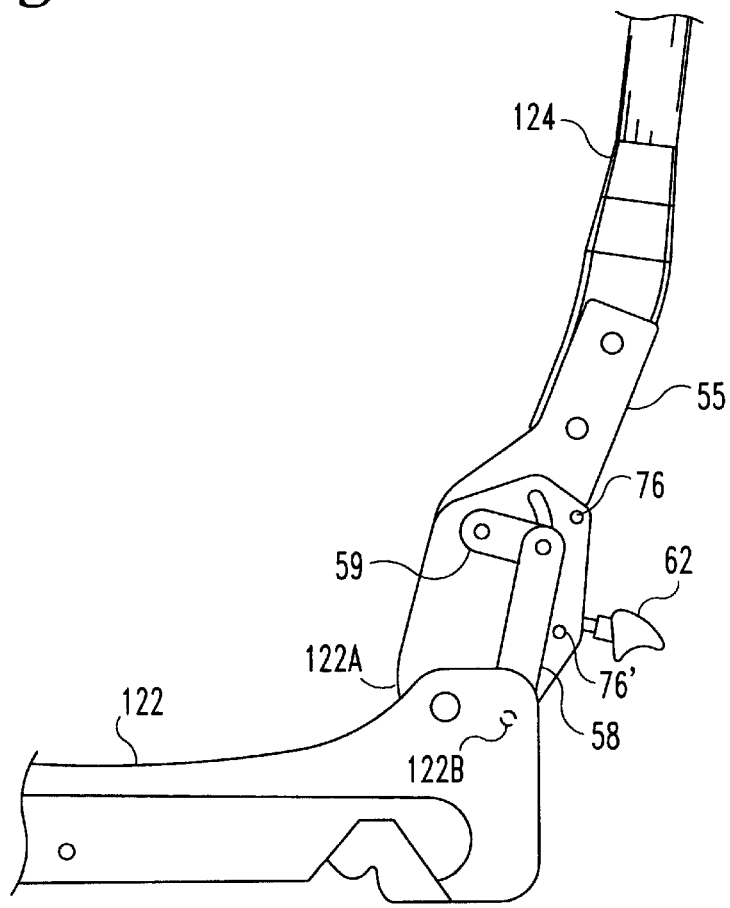
FIG. 8A is a side elevational view of the mechanism and structure of FIG. 7A with the seatback in an upright position

FIGS. 7B and 8B show the seat structures of FIGS. 7A and 8A respectively in the fold-flat position. The folding of the seat back is controlled by release lever 62. This lever is mounted between the lower plates 52 and 53 and pivots on fastener 76'. Release lever 62 has a reaction end 64 that engages a stop face 68 on upper plate 55 to hold the upper plate 55 and the seat back in an upright seating position. A return spring 63 is attached to lower plate 53 to bias the release lever in an engaged position. In a preferred embodiment, the spring 63 is a coil spring with an arm extending through spring slot 79 so that as the release lever 62 is raised, the end of the spring 63 is pushed downward loading the spring. The spring 63 returns the release lever 62 to its engaged position when the release lever 62 is released.

As previously discussed, the recline angle of the seat back is determined by a separate recline adjuster attached to the lower end of the lower assembly at attachment 73. Again, the recline adjuster can take any of several available forms. Preferably the adjuster described in U.S. Pat. No. 5,441,129 would be the type that would be used. However, any suitable adjuster could be employed.

It should be noted that the folding and reclining operations are independent of each other. That is, when the seat back is folded, the recline angle is not disturbed so that when the seat back is returned to its upright position, it returns to the last set recline angle. Likewise, the recline angle of the seat back can be adjusted with the seatback in either the upright or folded positions. However, the recline angle is only observable when the seat back is upright.

Depending on load carrying requirements, the components for the fold-flat recliner herein described could be made of metal, such as steel. Although not described, washers or bushings could be used at the pivot points in the mechanism to reduce friction between the components.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A fold-flat seat recliner mechanism for use in a vehicle seat having a bottom frame, a seat back, and a recline adjuster for adjusting the recline angle of the seat back relative to the bottom frame, said mechanism comprising:

a lower member pivotably connected to the bottom frame and including a lower portion connectable to the recline adjuster so that said lower member pivots relative to the bottom frame in response to movement of the recline adjuster within a range of reclining positions;

an upper member mountable to the seat back and pivotably connected to said lower member so that the seat back is in folding rotation relative to the bottom frame; and a linkage connected between the bottom frame and said lower member operatively connected to said upper member to limit pivoting of said upper member relative to said lower member as a function of recline angle.

2. The fold-flat seat recliner mechanism of claim 1, wherein said linkage includes:

a first link pivotably attached at one end to the bottom frame;

a second link pivotably connected to said lower member at one end and pivotably connected at an opposite end to an opposite end of said first link;

wherein said lower member, said first and second links and the bottom frame define a parallelogram linkage; and wherein said parallelogram linkage is rotatable relative to the bottom frame in response to the recline adjuster within said range of reclining positions.

3. The fold-flat seat recliner mechanism of claim 2, further including a stop pin attached to said upper member at one end and wherein said second link defines a stop area configured to engage said stop pin to stop the upper member in a predetermined orientation relative to the bottom frame when the seat back is placed in a folded position from any recline angle within said range of reclining positions.

4. The fold-flat seat recliner mechanism of claim 3, wherein said lower member defines an arcuate slot and said stop pin has a free opposite end disposed within said slot so that said stop pin engages an end of said slot when the seat back is in a seating position and wherein said slot and said second link cooperate to limit rotation of said upper member as a function of recline angle.

5. The fold-flat seat recliner mechanism of claim 4, further including a latch operable from an engaged position inhibiting folding of the seat back to a disengaged position permitting folding of the seat back, said latch including:

a pawl pivotably attached to said lower member, said pawl having a reaction end and disposed so that said reaction end engages said stop pin when the seat back is in said seating position;

a release lever pivotably attached to said lower member and operable between a first position wherein said lever is engaged with said pawl urging said pawl against said stop pin thereby inhibiting rotation of the seat back, and a second position whereby said lever is disengaged from said pawl to enable rotation of the seat back to said folded position; and a spring between said lever and said lower member to bias said lever against said pawl.

6. The fold-flat seat recliner mechanism of claim 2 wherein said lower member includes:

a left plate and a right plate connectable to said left plate, said left and right plates defining upper and lower pivot sleeve bores;

upper and lower pivot sleeves receivable in said corresponding upper and lower pivot sleeve bores;

a plurality of fasteners for connecting said left and right plates;

wherein the bottom frame defines a pivot bore for passage of said lower pivot sleeve therethrough for attachment of said lower member to the bottom frame; and wherein a lower portion of said upper member is disposed between said left and right plates and defines a pivot bore for passage of said upper pivot sleeve therethrough for attachment of said upper member to said lower member.

7. The fold-flat seat recliner mechanism of claim 6, further including a latch operable from an engaged position inhibiting folding of the seat back to a disengaged position permitting folding of the seat back.

8. The fold-flat seat recliner mechanism of claim 7 wherein:

said lower portion of said upper member defines a stop face; and said latch includes, a release lever disposed between said left and right plates and pivotably attached to at least one of said left and right plates and operable between a first position wherein said lever is engaged with said stop face thereby inhibiting rotation of the seat back, and a second position whereby said lever is disengaged from said stop face to enable rotation of the seat back to a folded position; and a spring between said lever and one of said left and right plates to bias said lever against said stop face.

9. The fold-flat seat recliner mechanism of claim 6 wherein said lower member defines an arcuate slot and said first and second links are connected by a link pin extending through said slot whereby said slot determines the range of rotation of said parallelogram linkage, thereby determining said range of reclining positions for the seat back.

10. The fold-flat seat recliner mechanism of claim 9 wherein:

an upper portion of said upper member defines a relief notch configured to receive said link pin to enable rotation of said linkage throughout said range of reclining positions for the seat back; and wherein said lower portion of said upper member defines a stop notch configured to engage said link pin to stop said upper member in a predetermined orientation relative to the bottom frame when the seat back is placed in said folded position.

11. The fold-flat seat recliner mechanism of claim 10, wherein said stop notch, said link pin and one of said fasteners cooperate to limit rotation of said upper member as a function of recline angle.

12. A seat for a vehicle comprising:

a bottom frame;

a seat back;

a recline adjuster;

a lower member pivotably connected to said bottom frame and including a lower portion connectable to said recline adjuster so that said lower member pivots relative to said bottom frame in response to movement of said recline adjuster within a range of reclining positions;

an upper member mountable to said seat back and pivotably connected to said lower member so that said seat back is in folding rotation relative to said bottom frame; and a linkage connected between said bottom frame and said lower member operatively connected to said upper member to limit pivoting of said upper member relative to said lower member as a function of recline angle.

13. The vehicle seat of claim 12, further including:

a first link pivotably attached at one end to said bottom frame;

a second link pivotably connected to said lower member at one end and pivotably connected at an opposite end to an opposite end of said first link;

wherein said lower member, said first and second links and said bottom frame define a parallelogram linkage; and wherein said parallelogram linkage is rotatable relative to said bottom frame in response to said recline adjuster within said range of reclining positions.

14. The vehicle seat of claim 13, further including a stop pin attached to said upper member at one end and wherein said second link defines a stop area configured to engage said stop pin to stop said seat back in a predetermined orientation relative to said bottom frame when said seat back is placed in a folded position from any recline angle within said range of reclining positions.

15. The vehicle seat of claim 14, wherein said lower member defines an arcuate slot and said stop pin has a free opposite end disposed within said slot so that said stop pin engages an end of said slot when said seat back is in a seating position; and wherein said slot and said second link cooperate to limit rotation of said seat back as a function of recline angle.

16. The vehicle seat of claim 15, further including a latch operable from an engaged position inhibiting folding of said seat back to a disengaged position permitting folding of said seat back, said latch including:

a pawl pivotably attached to said lower member, said pawl having a reaction end and disposed so that said reaction end engages said stop pin when said seat back is in said seating position;

a release lever pivotably attached to said lower member and operable between a first position wherein said lever is engaged with said pawl urging said pawl against said stop pin thereby inhibiting rotation of said seat back, and a second position whereby said lever is disengaged from said pawl to enable rotation of said seat back to said folded position; and a spring between said lever and said lower member to bias said lever against said pawl.

17. The vehicle seat of claim 13 wherein said lower member includes:

a left plate and a right plate connectable to said left plate, said left and right plates defining upper and lower pivot sleeve bores;

upper and lower pivot sleeves receivable in said corresponding upper and lower pivot sleeve bores;

a plurality of fasteners for connecting said left and right plates;

wherein said bottom frame defines a pivot bore for passage of said lower pivot sleeve therethrough for attachment of said lower member to said bottom frame; and wherein a lower portion of said upper member is disposed between said left and right plates and defines a pivot bore for passage of said upper pivot sleeve therethrough for attachment of said upper member to said lower member.

18. The vehicle seat of claim 17, further including a latch operable from an engaged position inhibiting folding of said seat back to a disengaged position permitting folding of said seat back.

19. The vehicle seat of claim 18 wherein:

said lower portion of said upper member defines a stop face; and said latch includes, a release lever disposed between said left and right plates and pivotably attached to at least one of said left and right plates and operable between a first position wherein said lever is engaged with said stop face thereby inhibiting rotation of said seat back, and a second position whereby said lever is disengaged from said stop face to enable rotation of said seat back to said folded position; and a spring between said lever and one of said left and right plates to bias said lever against said stop face.

20. The vehicle seat of claim 17 wherein said lower member defines an arcuate slot and said first and second links are connected by a link pin extending through said slot whereby said slot determines the range of rotation of said parallelogram linkage, thereby determining said range of reclining positions for said seat back.

21. The vehicle seat of claim 20 wherein:

an upper portion of said upper member defines a relief notch configured to receive said link pin to enable rotation of said linkage throughout said range of reclining positions for said seat back; and wherein said lower portion of said upper member defines a stop notch configured to engage said link pin to stop said upper member in a predetermined orientation relative to said bottom frame when said seat back is placed in said folded position.

22. A fold-flat seat recliner mechanism for use in a vehicle seat having a bottom frame, a seat back, and a recline adjuster for adjusting the recline angle of the seat back relative to the bottom frame, said mechanism comprising:

a lower member pivotably connected to the bottom frame and including a lower portion connectable to the recline adjuster so that said lower member pivots relative to the bottom frame in response to movement of the recline adjuster within a range of reclining positions;

an upper member mountable to the seat back and pivotably attached to said lower member so that the seat back is in folding rotation relative to the bottom frame;

a latch mechanism operable between a latched position locking said upper member to said lower member to inhibit pivoting thereabout and an unlatched position allowing rotation of said upper member relative to said lower member; and a linking member coupled to the bottom frame, said linking member having a stop surface engageable by said upper member such that said linking member provides a single limit of rotation of said upper member relative to said bottom frame within said range of reclining positions.

23. The fold-flat seat recliner mechanism of claim 22, wherein said latch mechanism includes:

a stop pin attached to said upper member at one end;

a pawl pivotably attached to said lower member, said pawl having a reaction end and disposed so that said reaction end engages said stop pin when the seat back is in a seating position;

a release lever pivotably attached to said lower member and operable between a first position wherein said lever is engaged with said pawl urging said pawl against said stop pin thereby inhibiting rotation of the seat back relative to said lower member, and a second position whereby said lever is disengaged from said pawl to enable rotation of the seat back relative to said lower member to a folded position without disturbing the recline angle of the seat back; and a spring between said lever and said lower member to bias said lever against said pawl.

24. The fold-flat seat recliner mechanism of claim 23, wherein:

said recliner mechanism further comprises a linkage connected between the bottom frame and said lower member, said linkage including said linking member; and said lower member defines an arcuate slot and said stop pin has a free opposite end disposed within said slot so that said stop pin engages an end of said slot when the seat back is in a seating position and wherein said slot and said linkage cooperate to limit rotation of said upper member as a function of recline angle such that a single limit of rotation of said upper member relative to said frame bottom is provided.

25. A fold-flat seat recliner mechanism for use in a vehicle seat, said mechanism comprising:
   a bottom frame;
   a seat back;
   a recline mechanism including:
      a lower member connected to said bottom frame and including a lower portion;
      a recline adjuster coupled to said lower portion and said bottom frame so that said lower member pivots relative to said bottom frame in response to movement of said recline adjuster within a range of reclining positions;
      a first link pivotably attached at one end to said bottom frame;
      a second link pivotably connected to said lower member at one end and pivotably connected at an opposite end to an opposite end of said first link;
      wherein said lower member, said first and second links in said bottom frame define a parallelogram linkage; and
      wherein said parallelogram linkage is rotatable relative to said bottom frame in response to said recline adjuster within said range of reclining positions; and
   a folding mechanism attached to the recline mechanism operable to fold said seat back relative to said bottom frame independent of said recline mechanism.

26. The fold-flat seat recliner mechanism of claim 25, wherein said folding mechanism includes:
   an upper member mountable to said seat back and pivotably attached to said lower member so that said seat back is in folding rotation relative to said bottom flame;
   a stop pin attached to said upper member at one end and wherein said second link defines a stop area configured to engage said stop pin to stop said upper member in a predetermined orientation relative to said bottom frame when said seat back is placed in a folded position from any recline angle within said range of reclining positions; and
   a latch mechanism operable between a latched position locking said upper member to said lower member to inhibit rotation thereabout and an unlatched position allowing rotation of said upper member relative to said lower member.

27. The fold-flat seat recliner mechanism of claim 26, wherein said latch mechanism includes:
   a pawl pivotably attached to said lower member, said pawl having a reaction end and disposed so that said reaction end engages said stop pin when said seat back is in a seating position;
   a release lever pivotably attached to said lower member and operable between a first position wherein said lever is engaged with said pawl urging said pawl against said stop pin thereby inhibiting rotation of said seat back relative to said lower member, and a second position whereby said lever is disengaged from said pawl to enable rotation of said seat back relative to said lower member to a folded position without disturbing the recline angle of said seat back; and
   a spring between said lever and said lower member to bias said lever against said pawl.

28. The fold-flat seat recliner mechanism of claim 26, wherein said lower member defines an arcuate slot and said stop pin has a free opposite end disposed within said slot so that said stop pin engages an end of said slot when said seat back is in a seating position.

29. A fold-flat seat recliner mechanism for use in a vehicle seat, said mechanism comprising:
   a bottom frame including a bottom cushion;
   a lower member connected to the bottom frame;
   a recline adjuster connected to said lower member so that said lower member pivots relative to said bottom frame in response to movement of said recline adjuster within a range of reclining positions;
   a seat back having a back cushion and pivotably connected to said lower member at a pivot point positioned so that said seat back can be folded with said back cushion in a substantially horizontal position relative to said bottom cushion;
   a first link pivotably attached at one end to said bottom frame;
   a second link pivotably connected to said lower member at one end and pivotably connected at an opposite end to an opposite end of said first link;
   wherein said lower member, said first and second links and said bottom frame define a parallelogram linkage; and
   wherein said parallelogram linkage is rotatable relative to said bottom frame within a range of reclining positions.

30. The fold-flat seat recliner mechanism of claim 29, wherein said seat back includes an upper member mountable to said seat back and pivotably attached to said lower member at a pivot point positioned so that said seat back can be folded to a substantially horizontal position.

31. The fold-flat seat recliner mechanism of claim 30 wherein said mechanism further includes:
   a stop pin attached to said upper member at one end and wherein said second link defines a stop area configured to engage said stop pin to stop said seat back in a substantially horizontal position when said seat back is placed in a folded position from any recline angle within said range of reclining positions; and
   a latch mechanism operable between a latched position locking said upper member to said lower member to inhibit rotation thereabout and an unlatched position enabling rotation of said upper member relative to said lower member.

* * * * *